(No Model.)
G. J. SPENNEBERG.
SHAFT HOLDER.
No. 352,494. Patented Nov. 9, 1886.
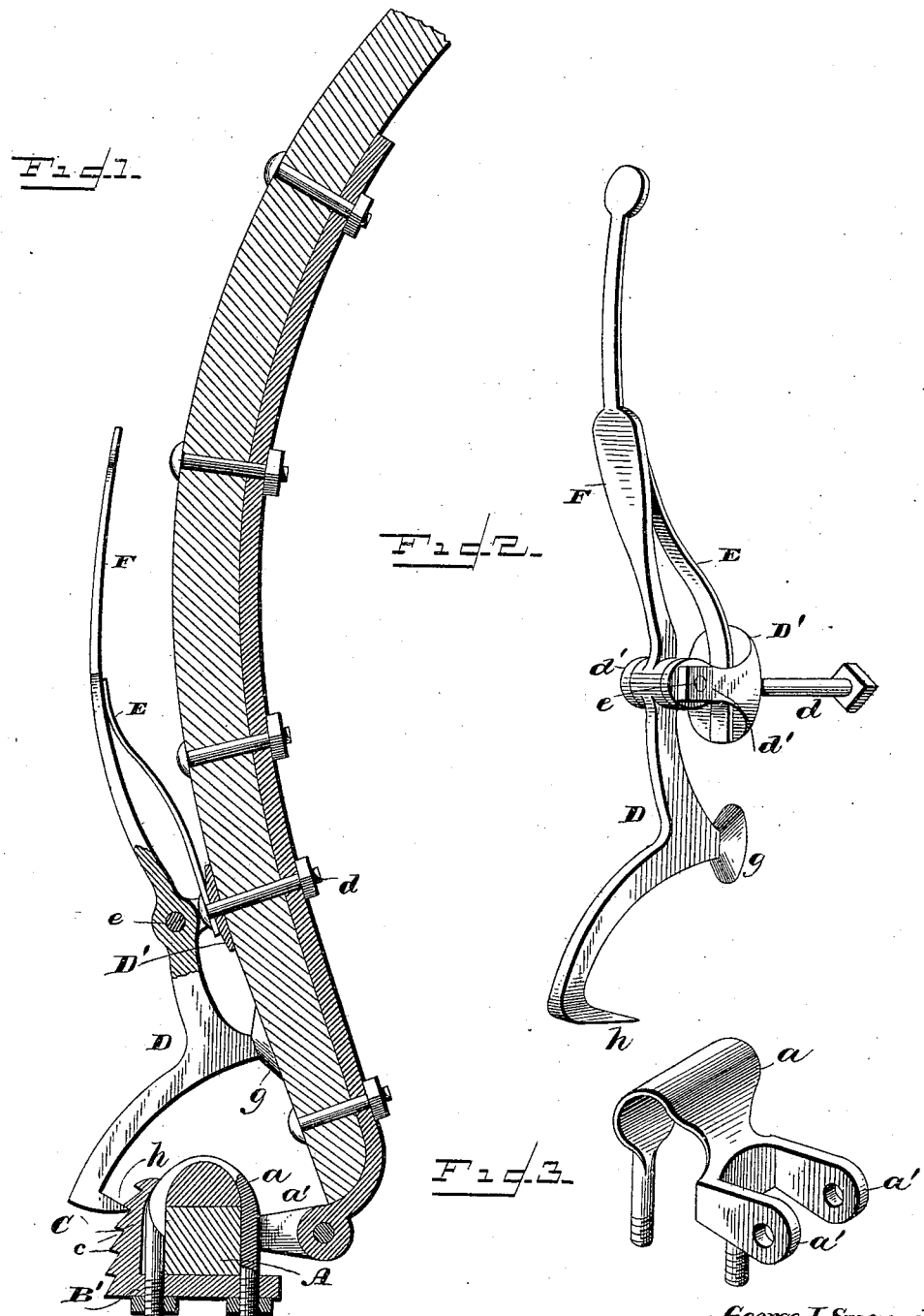
WITNESSES
G. S. Elliott.
E. W. Johnson
George J. Spenneberg.
INVENTOR
Attorney

United States Patent Office.

GEORGE J. SPENNEBERG, OF CARROLLTON, KENTUCKY, ASSIGNOR OF TWO-THIRDS TO JOSEPH A. DONALDSON AND DANIEL BROMLEY, BOTH OF SAME PLACE.

SHAFT-HOLDER.

SPECIFICATION forming part of Letters Patent No. 352,494, dated November 9, 1886.

Application filed August 12, 1886. Serial No. 210,719. (No model.)

*To all whom it may concern:*

Be it known that I, GEORGE J. SPENNEBERG, a citizen of the United States of America, residing at Carrollton, in the county of Carroll and State of Kentucky, have invented certain new and useful Improvements in Shaft-Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in shaft or thill holders, the object of my device being to provide a means which is attached to the shaft and axle of a vehicle, so that the shafts or thills may be held in an elevated position when desired; and to this end my invention consists in the construction and combination of the parts, as will be hereinafter fully set forth, and specifically pointed out in the claims.

In the accompanying drawings, which illustrate my invention, Figure 1 is a sectional view showing the device applied to the axle and shaft. Fig. 2 is a detail perspective view of the parts of my improved shaft-holder which are attached to the shafts, and Fig. 3 is a detail perspective view.

A refers to the axle of a vehicle, to which the ends of the shaft are pivotally attached in the usual manner by means of a clip, a, which is provided with forwardly-projecting perforated ears a', through which perforations the bolt for connecting the shaft-iron thereto passes. The depending screw-threaded bars of said clip pass through a plate, B', which is provided at its rear portion with an upwardly-projecting portion, C, which is provided with esrrations c, said portion being located in rear of the axle and opposite to the clip.

D refers to the pivoted supporting-bar, which is pivotally attached to the bent portion of the shaft by a bolt, d, which passes through a centrally-perforated block, D', which is provided with upwardly-projecting ears d', through which pass a bolt, e, said bolt also passing through a perforation in the supporting-bar D.

E refers to a spring, which is held in place by a bolt, d, which passes through a perforation in the end thereof, the opposite end of said spring bearing upon a flattened portion, F, of the bar D. The lower end of the supporting-bar is provided with an enlarged portion or knob, g, which will bear normally upon the upper edge of the shaft when its hooked end h is not in engagement with the teeth c of the plate which is attached to the axle.

By reference to the drawings the construction of the parts not hereinbefore referred to will be fully understood.

When the parts are attached to the axle and shaft, as shown, the knob or block g will normally bear upon the upper portion of the thill—that is, when the parts are out of engagement—so as to prevent the parts rattling upon each other. When the shafts are elevated beyond the position which they occupy when in use, the hooked end of the pivoted bar D will engage with the serrated teeth, so as to hold the shafts in an elevated position. By depressing the end of the lever the parts may be readily thrown out of engagement.

I claim—

1. In a device for supporting thills, the combination of the bar D, pivotally attached near the lower end of the same, and provided with a spring, E, a knob or bearing, g, formed integral therewith, and located between its pivotal point and hooked end, and a serrated plate, C, attached rigidly to the axle, substantially as shown, and for the purpose set forth.

2. In a thill-support, a bar, D, pivoted near the lower end of the thills and provided with an enlarged bearing-block, g, which is held in contact with the upper portion of the thill by a spring which bears upon its opposite end, substantially as shown, and for the purpose set forth.

In testimony whereof I affix my signature in presence of two witnesses.

GEORGE J. SPENNEBERG.

Witnesses:
JOHN M. GILTNEY,
JOSEPH A. DONALDSON.